United States Patent [19]
Evans et al.

[11] Patent Number: 5,000,895
[45] Date of Patent: Mar. 19, 1991

[54] METHOD FOR PREVENTING PLASTIC FROM HARDENING IN A DISPENSER TIP

[75] Inventors: Steven L. Evans, Fenton; Joseph R. Dolezal, St. Louis, both of Mo.

[73] Assignee: Chrysler Corporation, Highland Park, Mich.

[21] Appl. No.: 585,398

[22] Filed: Aug. 8, 1990

[51] Int. Cl.[5] ............ B29C 67/00
[52] U.S. Cl. ............ 264/83; 222/108; 222/544; 264/39; 264/516; 264/313; 425/215
[58] Field of Search ............ 264/39, 83, 512, 513, 264/576, 313; 222/108, 544; 425/215

[56] References Cited

U.S. PATENT DOCUMENTS

| | | | |
|---|---|---|---|
| 572,603 | 12/1896 | Hare | 222/108 |
| 3,922,126 | 11/1975 | Seaver et al. | 425/215 X |
| 4,671,331 | 6/1987 | Pruden | 222/108 X |
| 4,830,793 | 5/1989 | Fermigier et al. | 264/39 |

*Primary Examiner*—Jan H. Silbaugh
*Assistant Examiner*—Karen D. Kutach
*Attorney, Agent, or Firm*—Edward A. Craig

[57] ABSTRACT

A method for preventing hardening of plastic material in a dispenser tip during periods of nonuse of the dispenser tip. The method involves providing a balloon around the dispenser tip, and then filling the balloon with plastic material.

1 Claim, 1 Drawing Sheet

METHOD FOR PREVENTING PLASTIC FROM HARDENING IN A DISPENSER TIP

BACKGROUND OF THE INVENTION

Flowable plastic materials are commonly used in manufacturing processes as sealants and adhesives. For example, a single component polyurethane adhesive-sealer is commonly applied around the periphery of windshield glass to provide a sealant and adhesive. The material is applied as a bead. The commonly used polyurethanes cure at room temperature to a rubber-like consistency. The curing is caused by reaction with moisture in the air.

The plastic material is frequently dispensed as a bead from automatic dispensing machinery. Such dispensing machinery employs a nozzle-like dispensing tip connected to a plastic material source. During usage of the dispensing machinery, material is purged frequently enough to prevent hardening of the material in the dispensing tip and the area rearward thereto. However, during periods of non-use, such as may occur overnight, on weekends, during plant shut-downs and the like, material is not dispensed from the dispenser tips. If material is not frequently dispensed from the dispenser tip, it can harden in the passage of the dispenser tip and plug the dispenser tip and perhaps passageways therebehind. In order to prevent this from occurring, the dispenser tip has been purged at regular intervals during periods of non-use by forcing plastic material therethrough even though the material is not used. This material is lost by dumping it into a drum or other container. This is, of course, an expensive proposition.

In accordance with the present invention, a method is provided to prevent hardening of the plastic material during periods of non-use of dispensing machinery.

SUMMARY OF THE INVENTION

A method for preventing flowable plastic material of the type which cures in the ambient atmosphere from hardening in a dispenser tip during periods of non-use is provided. The method includes the step of first providing an elastomeric balloon having an expandable main body portion and an expandable hollow neck communicating therewith. The neck is mounted on a dispenser tip with the dispenser tip extending into the main body of the balloon. Then flowable plastic material is dispensed from the dispenser tip into the main body until the main body is filled with the outer end of the dispenser tip being encased within the plastic material.

IN THE DRAWING

DETAILED DESCRIPTION OF A PREFERRED EMBODIMENT

Figure 1:
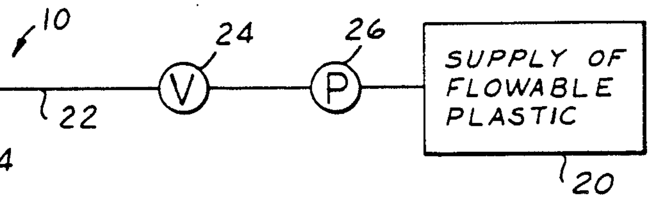
FIG. 1 is a diagrammatic view of dispensing machinery in accordance with which one embodiment of the present invention is used.
Figure 1:
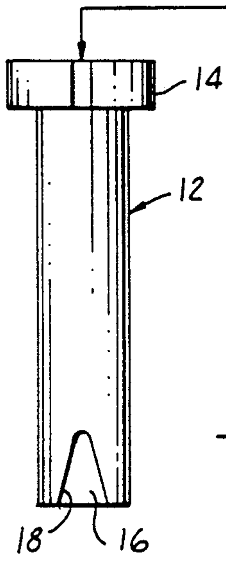
Figure 2:
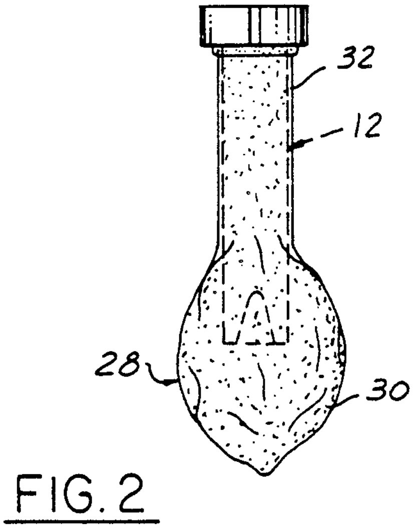
FIG. 2 is an elevational view of a dispenser tip with a balloon mounted thereon.

Referring to FIG. 1, it will be noted that plastic dispensing machinery 10 includes a dispenser tip 12. The dispenser tip 12 is a hollow nozzle-like element usually fabricated of a plastic material. Enlarged head 14 is secured to the outlet from the dispensing machine 10. The dispenser tip 12 terminates in an open end 16. A V-shaped notch 18 is provided in the end 16 to facilitate the proper shape of a bead of the dispensed material being formed on a piece, such as the periphery of windshield 5. glass. The dispenser tip 12 is connected to a supply of flowable plastic 20 via line 22 which may have, for example, a valve 24 and pump 26 therein. The flowable plastic material is usually in a viscous condition. The material may be, for example, a polyurethane which cures to a rubber-like consistency when exposed to the ambient atmosphere.

The dispenser tip 12 is frequently mounted on a robot. The robot moves the dispenser tip 12 around the periphery of windshield glass or other structure to provide a bead of urethane. The urethane functions as a sealant and adhesive.

In order to prevent hardening of the plastic material during periods of non-use of the dispenser tip 12, the method of the present invention is employed.

Firstly, an elastomeric balloon 28 having an expandable main body 30 and an expandable open-ended hollow neck 32 communicating therewith is provided. The balloon may be fabricated of rubber or a suitable plastic. When it is desired to deactivate the dispenser tip 12, the neck 32 is mounted on the dispenser tip 12 with the dispenser tip 12 extending into the main body 30 of the balloon 28.

Figure 3:
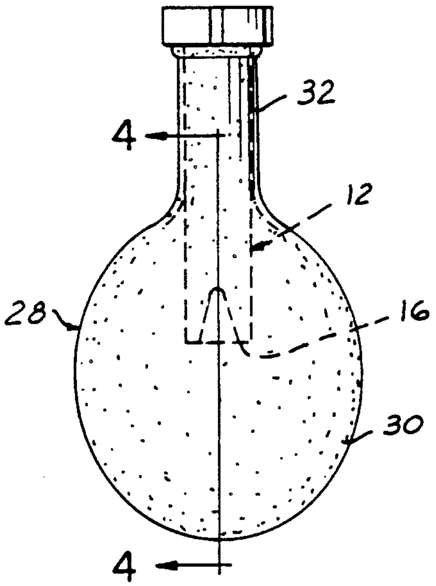
FIG. 3 is a view similar to FIG. 2 with the main body of the balloon filled with plastic material.
Figure 4:
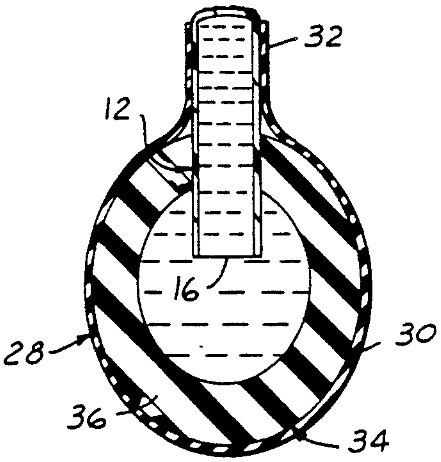
FIG. 4 is a sectional view illustrating the condition of the plastic material within the balloon after the material has cured to some extent.

After the balloon 28 has been mounted, flowable plastic material is dispensed by means of the dispensing machinery 10 through the dispenser tip 12 into the main body 30 of the balloon 28 until the main body 30 is filled as illustrated in FIG. 3. The elastomeric nature of the balloon 28 permits expansion of the main body so that it is assured that the main body 30 is filled as illustrated. Air present in the balloon is forced radially outwardly during the filling process. The outer end 16 of the dispenser tip 12 is encased within the plastic material 34 as illustrated in FIG. 4.

After a period of time, the radially outward portion of the plastic material 34 will cure forming an outer layer 36 of the plastic material 34. The layer 36 forms a protective outer shell sealing the center or core portion 38 from the ambient atmosphere and preventing curing thereof. The curing is a consequence of the ambient atmosphere which is present radially outwardly of the balloon 28 interior. As mentioned, the air is forced outwardly during the step of filling the balloon. However, the curing process terminates because of the limited amount of air and the center or core 38 will remain in a flowable viscous state for a relatively long time. Thus, as long as the balloon 28 remains on the dispenser tip 12, the plastic material 40 in the passageway 42, defined by the dispenser, tip 12 is inhibited from curing.

We claim:

1. The method for preventing flowable plastic material of the type which cures when exposed to air from curing in a hollow tubular dispenser tip during periods of extended non-use of the dispenser tip comprising the steps of:

a. providing an elastomeric balloon having an expandable main body portion and an expandable open-ended hollow neck communicating therewith;

b. mounting the neck on a dispenser tip with the dispenser tip extending into the main body of the balloon;

c. dispensing flowable plastic material from the dispenser tip into the main body thereby forcing the air therewithin radially outwardly;

d. continuing said dispensing of flowable plastic material until the main body is substantially filled with the outer end of the dispenser tip encased within the plastic material; and e. curing the radially outward portion of the plastic material by means of the air trapped in the main body to form a protective outer shell sealing the center portion from the ambient atmosphere and inhibiting curing thereof.

* * * * *